United States Patent
Prater, Jr.

(10) Patent No.: US 10,048,372 B1
(45) Date of Patent: Aug. 14, 2018

(54) METHODS AND SYSTEMS FOR RESOLUTION OF SONAR IMAGES

(71) Applicant: James L. Prater, Jr., Panama City, FL (US)

(72) Inventor: James L. Prater, Jr., Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 341 days.

(21) Appl. No.: 15/130,111

(22) Filed: Apr. 15, 2016

(51) Int. Cl.
*G01S 15/89* (2006.01)

(52) U.S. Cl.
CPC .................. *G01S 15/89* (2013.01)

(58) Field of Classification Search
CPC ...................................... G01S 15/89
See application file for complete search history.

(56) References Cited

U.S. PATENT DOCUMENTS

| 4,686,532 A | * | 8/1987 | McAulay | G01S 7/295 367/87 |
| 6,721,694 B1 | * | 4/2004 | Lambrecht | G01S 15/89 367/21 |

* cited by examiner

*Primary Examiner* — Daniel T Pihulic
(74) *Attorney, Agent, or Firm* — James T. Shepherd

(57) ABSTRACT

To evaluate the resolution of individual sonar images in field conditions without specific targets, a statistical sampling of the imagery is taken and analyzed. Large quantities of resolution measurements are made on point-objects identified in the imagery. The measurements are compared to improve fidelity and generate statistically significant results. The image is broken into segments for analysis to identify variation in resolution across the image. The mean value of point-target resolution per segment can be determined for the imagery. A segment with an insufficient number of measurements required to determine a statistically significant value for resolution is rejected. The image resolution can be determined as the mean or median value of the segment measurements for the entire image.

16 Claims, 2 Drawing Sheets

METHODS AND SYSTEMS FOR RESOLUTION OF SONAR IMAGES

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The present invention relates to image resolution. More particularly, the present invention relates to methods and systems to determine the resolution of a sonar image.

(2) Description of the Prior Art

Sonar image resolution and concomitant image quality are difficult to determine in field conditions. While there are relationships that can predict the theoretical limit of range and cross-range resolution, theoretical limits are rarely achieved in practice. In an attempt to measure achieved resolution, one often uses some target and evaluates the response of the target to determine the 3 dB down width of the point object response. This exercise is difficult in that the targets are often larger than the intended resolution and difficult to image at the desired range and aspect due to localization errors experienced in underwater navigation.

Future synthetic aperture sonar (SAS) systems will need to operate in shallow water littoral environments. Very shallow water environments are known to have low ping-to-ping correlation and elevated levels of system motion. Current generation motion estimation techniques are not reliable in low correlation environments when system motion is high.

Thus, a need has been recognized in the state of the art to develop innovative techniques in order to quantify the fidelity of SAS imagery.

SUMMARY OF THE INVENTION

It is therefore a general purpose and primary object of the present invention to provide methods and systems for determining the resolution of sonar images. In lieu of specific resolution targets described with respect to previous methods, point-objects on the seafloor are used. The methods and systems provide a mechanism to evaluate the resolution of individual sonar images in field conditions without specific targets.

The methods and systems rely on a statistical sampling of the imagery to improve performance when compared with single target methods that are typically employed. Statistics of the imagery are collected and large quantities of resolution measurements are made on point-objects identified in the imagery. While individual point-object responses are noise prone and can lead to erroneous measurements, the methods and systems described herein make many measurements and then compare the measurements to improve fidelity and generate statistically significant results.

Variation in resolution across an image can be identified as the image can be broken into segments for analysis. For example, a one meter square segment of imagery can be used and the mean value of point-target resolution per segment can be determined for imagery. A segment with an insufficient number of measurements required to determine a statistically significant value for resolution is rejected. The image resolution can be determined as the mean or median value of the segment measurements for the entire image.

In one embodiment, a method for evaluating the resolution of a sonar image includes obtaining a set of point objects from sonar data based on the responses of the point objects being greater than a threshold above a mean background response of the data. A resolution measurement is obtained for each of the point objects based on a peak width 3 dB down from peak intensity for the point object responses. The image is divided into a plurality of segments and a mean resolution is determined for each segment based on the resolution measurements for each point object within the segment. The mean resolution for the image is determined based on the mean resolutions of all the segments.

In determining the set of point objects, the method can include gathering intensity information from the sonar data and determining the mean background response based on the mean and standard deviation of the intensity information. Additionally, obtaining a resolution measurement can include collecting cross-sections of each point object response in a range-axis and in a cross-range axis.

Determining the set of point objects can also include determining a proximate distance between point objects wherein point objects proximate each other can be considered duplicate responses. The distance can be based on point resolution parameters of the data. When duplicate responses are located, the brightest among the plurality of objects is selected as the point object.

The method can also include determining whether each of the segments contains a number of point objects sufficient to obtain the mean resolution for the segment. If the segment contains less than a sufficient number of point objects to determine a statistically significant value, the segment is rejected as a poor resolution area within the image.

In one embodiment, a sonar image evaluation system includes a transmitter and an array of hydrophone elements obtaining sonar echoes from pings generated by the transmitter, a processor in communication with the hydrophone array and computer readable medium disposed within the processor. The computer readable medium can contain instructions for the processor to perform the steps of performing resolution measurements on point-objects identified in the sonar data from the hydrophone array, dividing the sonar image into segments, determining a mean point-target resolution value per segment based on the resolution measurements and determining the sonar image resolution based on the point-target resolution value for each segment.

The computer readable medium can contain further instructions to identify a response within the data as one of the point objects based on the response being greater than a threshold above a mean background response of the data. The threshold can be dependent on the gain of the system. Also, the computer readable medium can contain instructions for down-selecting the point objects based on selecting a brightest one of the point objects among a plurality of point objects proximate each other.

In one embodiment, a method of determining a mean resolution value of a sonar image includes performing resolution measurements on point objects identified in the sonar data of the image, dividing the sonar image into segments, determining a mean value of point-target resolution per segment based on the resolution measurements of the point objects within the segments and determining the mean resolution value of the sonar image based on the mean value of point-target resolution for each of the segments.

The method can include identifying a response within the data as one of the point objects based on the response being greater than a threshold above the mean background response of the data. Also, performing the resolution measurements can include collecting cross-sections of each point object response in a range-axis and in a cross-range axis and obtaining the resolution measurements based on a peak width 3 dB down from peak intensity for each of the point object responses.

In determining the mean resolution value of the sonar image, the method can include determining whether each of the segments contains a number of point objects sufficient to obtain a statistically significant value of the mean resolution for the segment. If the segment does not contain the sufficient number of point objects, the segment is rejected as a poor resolution area within the image.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
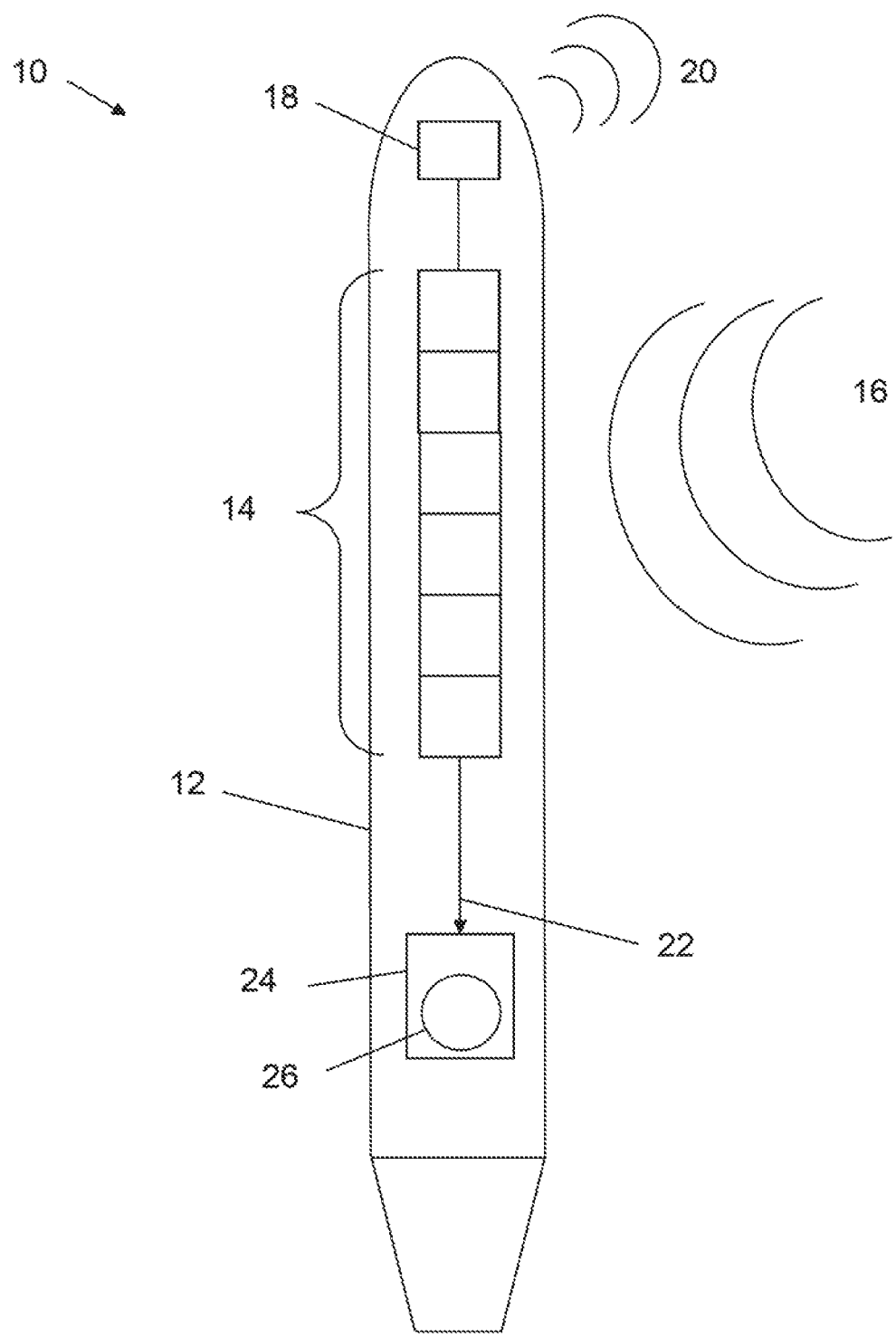
FIG. 1 illustrates a schematic view of a synthetic aperture sonar (SAS) system.

Referring now to FIG. 1, there is shown a schematic view of synthetic aperture sonar (SAS) system 10. Vehicle 12 of system 10 includes an array of hydrophone elements 14. As is known to those of skill in the art, the transmitter 18 generates a pulse (or "ping") that later reflects off of nearby objects, primarily the seafloor, and is reflected back to and is received by the hydrophone elements.

The hydrophone array 14 obtains echoes (illustrated as curved lines 16) from pings (illustrated as curved lines 20) and sends corresponding sonar data 22 to processor 24. Processor 24 includes computer readable medium 26 having instructions to process sonar data 22 to obtain sonar images. In addition, computer readable medium 26 includes instructions to determine the resolution of a sonar image as described herein.

Figure 2:
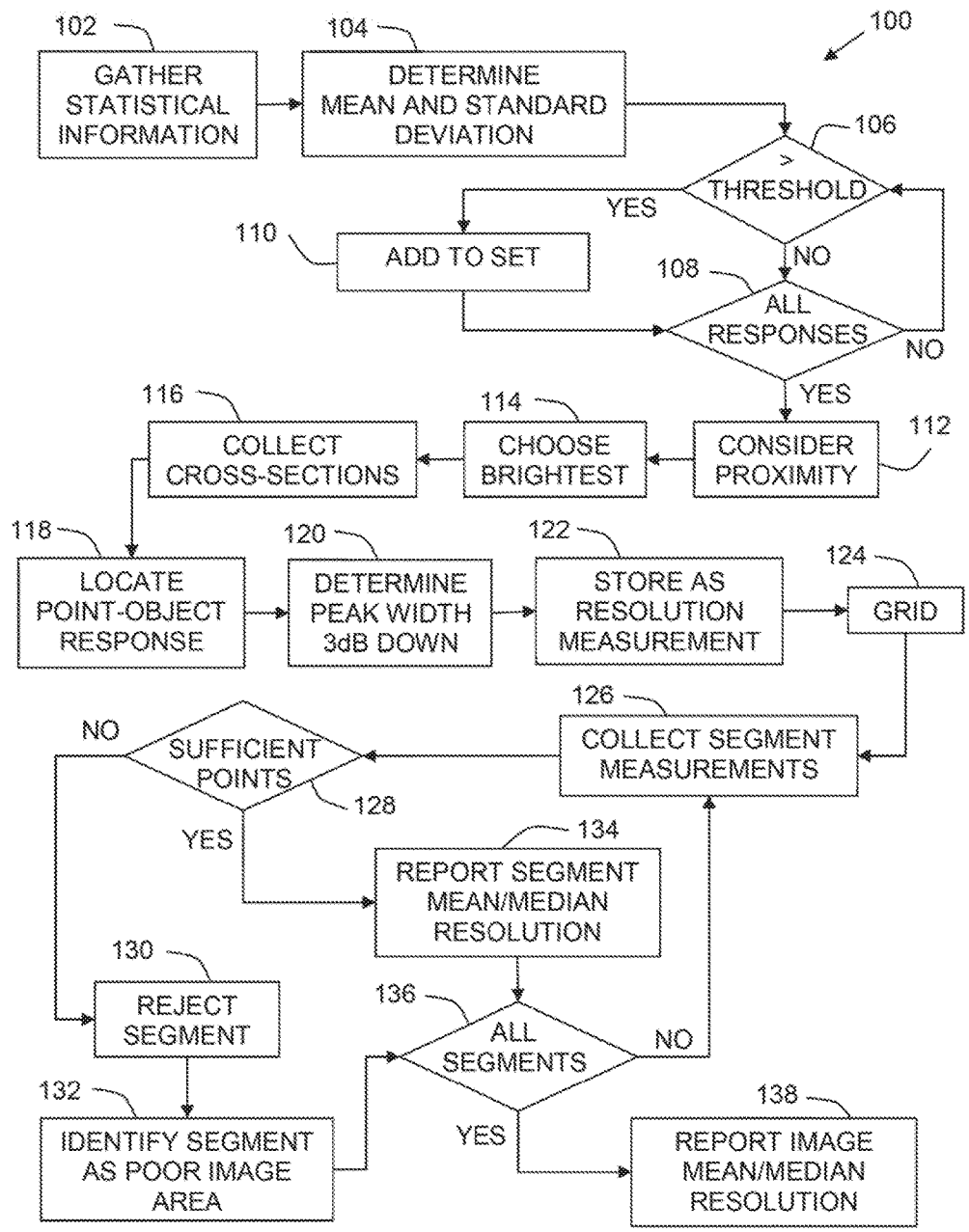
FIG. 2 illustrates a block diagram of a method for determining the resolution of a sonar image.

Referring now to FIG. 2, there is illustrated a block diagram of method 100 for determining the resolution of a sonar image as processor 24 executes the instructions on computer readable medium 26.

Method 100 was developed and was tested against previously collected sonar data from multiple environments. Method 100 is integrated into the beamforming process of system 10 and operates as further described herein. At block 102, statistical information is gathered from sonar data 22 to assess the imagery. Block 104 determines the mean and standard deviation of the intensity information based on the statistical information gathered.

Responses are compared to a threshold (block 106) until all responses are considered (block 108). The threshold is determined based on the typical gain of system 10. For purposes of illustration, but not for limitation, the threshold is taken herein as six standard deviations beyond the mean background. Responses above the threshold are considered point objects and are placed into a set of point objects (block 110).

Blocks 112 and 114 down-select the set of point objects to reduce the likelihood of double counting individual measurements. At block 112, proximity to other point objects is considered to reduce double counting. At block 114, the brightest one of multiple bright points becomes the point object. The point resolution parameters of system 10 in ideal environments can be used for proximity considerations.

Cross-sections of the point object response are collected in the range-axis and in the cross-range axis (block 116). As is known to those of skill in the art, this analysis is similar to that of the traditional resolution target method except it can be automated since the point response was automatically identified previously at blocks 106 through 110.

The point-object response is located in the sample (block 118) and the peak width 3 dB down from the peak intensity is determined (block 120) and stored (block 122) as a resolution measurement. The analysis at blocks 120 and 122 is also similar to the traditional resolution target method. However, as in the case of block 116, the process can be automated since the point response is automatically identified at blocks 106 through 110.

At block 124, the image is broken into a grid of image segments and the point object measurements are collected for each segment at block 126. The segment sizes can be determined by the user based on the trade-off between computational intensity and the desired resolution detail. Segments with an insufficient number of measurements to provide a statistically significant value for resolution, as determined at block 128, are rejected and not included in further calculations (block 130).

In addition, segments that do not have sufficient points for analysis as determined at block 128 are identified as areas where image performance is poor due to multi-path or other noise contamination (block 132). For those segments having sufficient points, the mean or median value for the segment is reported as the mean or median resolution of the imagery for the image segment (block 134). When all segments are processed, as determined at block 136, the resolution for the entire image (or sonar event) is determined as the mean or median of the resolution measurement for the segments (block 138).

Obviously many modifications and variations of the present invention may become apparent in light of the above teachings. For example, the number and configuration of elements 14 can be varied, as well as transmitter 18 and processor 24. In fact, processor 24 can be located distant from vehicle 12, with transmitter 18 transmitting data 22 remotely to processor 24.

Additionally, the configuration of blocks in method 100 can be changed to suit the requirements of processor 24. For example, the manner of considering whether all responses and all segments have been processed at blocks 108 and 136, respectively, can vary between processors. Further, the order for down-selecting the set of points at blocks 112 and 114 can be reversed. Similarly, rejection of segments (block 130) and identification of poor image areas (block 132) can also be reversed.

What have thus been described are systems and methods for evaluating the resolution of individual sonar images in field conditions without specific targets. It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method of sonar image resolution evaluation, comprising:

Providing, to a processor, sonar data of a sonar image collected by a sonar receiver;

obtaining a set of point objects from said sonar data based on responses of said point objects being greater than a threshold above a mean background response of said data;

obtaining a resolution measurement for each of said point objects based on a peak width 3 dB down from peak intensity for each of said point object responses;

dividing said image into a plurality of segments;

determining a mean resolution for each of said segments based on said resolution measurements for each said point object within said segment; and determining a mean resolution for said image based on said mean resolutions of said segments.

2. The method of claim 1, wherein determining a set of point objects further comprises:

gathering intensity information from said sonar data; and determining said mean background response based on a mean and standard deviation of said intensity information.

3. The method of claim 2, wherein obtaining a resolution measurement further comprises collecting cross-sections of each of said point object responses in a range-axis and in a cross-range axis.

4. The method of claim 3, further comprising:

determining whether each of said segments contains a number of said point objects sufficient to obtain a statistically significant value of said mean resolution for each of said segments; and rejecting one of said segments as a poor resolution area of said image when said one segment contains less than said number of point objects.

5. The method of claim 4, wherein determining a set of point objects further comprises:

determining a proximate distance based on point resolution parameters of said data; and selecting, as one of said set of point objects, a brightest one among a plurality of point objects within said proximate distance.

6. The method of claim 2, wherein determining a set of point objects further comprises:

determining a proximate distance based on point resolution parameters at said data; and selecting, as one of said set of point objects, a brightest one among a plurality of point objects within said proximate distance.

7. The method of claim 1, wherein obtaining a resolution measurement further comprises collecting cross-sections of each of said point object responses in a range-axis and in a cross-range axis.

8. The method of claim 7, wherein determining a set of point objects further comprises:

determining a proximate distance based on point resolution parameters of said data; and selecting, as one of said set of point objects, a brightest one among a plurality of point objects within said proximate distance.

9. A sonar image evaluation system, comprising:

a transmitter capable of generating acoustic pings;

a receiver configured to receive sonar echoes from said pings;

a processor in communication with said receiver; and a non-transitory computer readable medium disposed within said processor, said computer readable medium containing instructions for said processor to perform the steps of:

performing resolution measurements on point-objects identified in sonar data from said receiver;

dividing said sonar image into segments;

determining a mean value of point-target resolution per segment based on said resolution measurements; and determining said sonar image resolution based on said mean value of point-target resolution for each said segment.

10. The system of claim 9, wherein said computer readable medium contains further instructions to identify a response within said data as one of said point objects based on said response being greater than a threshold above a mean background response of said data.

11. The system of claim 10, wherein said threshold is dependent on a gain of said system.

12. The system of claim 11, wherein said computer readable medium contains further instructions for down-selecting said point objects based on selecting a brightest one of said point objects among a plurality of point objects proximate each other.

13. A method of determining a mean resolution value of a sonar image, comprising:

providing, to a processor, sonar data of said image collected by a sonar receiver;

performing resolution measurements on point objects identified in said sonar data;

dividing said image into segments;

determining a mean value of point-target resolution per segment based on said resolution measurements on said point objects within said segments; and determining said mean resolution value of said sonar image based on said mean value of point-target resolution for each of said segments.

14. The method of claim 13, further comprising identifying a response within said data as one of said point objects based on said response being greater than a threshold above a mean background response of said data.

15. The method of claim 14, wherein performing resolution measurements further comprises:

collecting cross-sections of each of said point object responses in a range-axis and in a cross-range axis; and obtaining said resolution measurements based on a peak width 3 dB down from peak intensity for each of said point object responses.

16. The method of claim 15, wherein determining said mean resolution value of said sonar image further comprises:

determining whether each of said segments contains a number of said point objects sufficient to obtain a statistically significant value of said mean resolution for each of said segments; and rejecting one of said segments as a poor resolution area of said image when said one segment contains less than said number of point objects.

* * * * *